United States Patent [19]

Haarasilta et al.

[11] Patent Number: 5,176,927
[45] Date of Patent: * Jan. 5, 1993

[54] METHOD OF IMPROVING THE PRODUCTION PROCESS OF DRY CEREAL PRODUCTS BY ENZYME ADDITION

[75] Inventors: Sampsa Haarasilta, Kerava; Timo Pullinen, Vantaa; Ina Tammersalo-Karsten, Espoo; Seppo Vaisanen, Kerava; Harri Franti, Vantaa, all of Finland

[73] Assignee: Cultor Ltd., Helsinki, Finland

[*] Notice: The portion of the term of this patent subsequent to Feb. 5, 2008 has been disclaimed.

[21] Appl. No.: 729,782

[22] Filed: Jul. 10, 1991

Related U.S. Application Data

[63] Continuation of Ser. No. 419,887, Oct. 11, 1989, abandoned.

[30] Foreign Application Priority Data

Oct. 11, 1988 [FI] Finland .................................. 844668

[51] Int. Cl.⁵ .............................................. A21D 2/00
[52] U.S. Cl. ........................................ 426/20; 426/18; 426/61
[58] Field of Search ................. 426/7, 18, 20, 61, 549

[56] References Cited

U.S. PATENT DOCUMENTS 3,512,992  5/1970  Cooke et al. .......................... 426/61
4,990,343  2/1991  Haarasilta et al. .................... 426/10

FOREIGN PATENT DOCUMENTS 2555602  11/1984  France .

OTHER PUBLICATIONS

Chemical Abstracts, vol. 78, No. 9, 56693f, Mar. 5, 1973, Weipert Rheology of Rye Dough II. Effect of Enzymes of Various Specificity on the Rheological Properties of the Dough.
Cereal Chemistry, vol. 45, No. 4 1968, Kulp Enzymeolysis of Pentosans in Wheat Flour.
Cereal Chemistry 66(2): 73–78 Nov. 1988, Gaines et al. Effect of Selected Commercial Enzymes on Cookie Spread and Cookie Dough Consistency.
Matz, S. Cookie and Cracker Technology, 1968, p. 30, AVI Publishing Co., Westport, Conn.
Rombauer et al., Joy of Cooking, 1975, p. 618 Bobbs-Merrill Co. Inc., N.Y.
Tracey, The Role of Wheat Flour Pentosans in Baking. J. Sci. Fd. Agric., p. 64, vol. 15, Sep. pp. 607–611.

Primary Examiner—Joseph Golian
Assistant Examiner—Leslie Wong
Attorney, Agent, or Firm—Baker & McKenzie

[57] ABSTRACT

The invention relates to a method of improving the production process of dry cereal products, such as crispbread and biscuits, by adding hemicellulose and cellulose degrading enzymes to the dough. The enzyme addition improves the properties of the dough and increases the process capacity by decreasing the need for dough liquid.

22 Claims, No Drawings

METHOD OF IMPROVING THE PRODUCTION PROCESS OF DRY CEREAL PRODUCTS BY ENZYME ADDITION

This application is a continuation of application Ser. No. 419,877, filed Oct. 11, 1989 now abandoned.

FIELD OF THE INVENTION

This invention relates to a method of improving the production process of dry cereal products by adding cellulolytic and/or hemicellulolytic enzymes to the dough used to make these products. The invention improves the properties of the doug (for example, dough transferability) and decreases the amount of water which needs to be added to the dough to achieve an acceptable final product. The decrease in water needed has profound effects on the efficiency and capacity of the baking process. The invention permits a wider choice of flour and results in a final product with improved crispness and other properties.

BACKGROUND OF THE INVENTION

One of the most popular forms of baked goods are so-called "dry cereal products"; namely, baked products which have low water concentrations and are, therefore, crispier than soft products such as bread or cake. As used herein, the term "dry cereal products" refers to baked products made from grain, such as crispbread, biscuits, rusk, breadcrumbs, sour crispbread, crackers, baked snacks, waffles, cookies, pretzels, ice cream cones and dark bread.

Dry cereal products have a longer shelf life and can be distributed over wide geographic areas in contrast to soft products which are highly perishable and are typically distributed on a more local basis. Dry product processes tend to be larger and more intricate—and often more automated—as a result.

A bottleneck in the production process of dry cereal products, such as crispbread, biscuits, sour crispbread, and dark bread, etc. is often the limited production capacity of ovens used, but increasing oven size requires high capital investment. Attempts have also been made to improve the process efficiency by using flour with a low water-binding capacity and by other apparatus improvements. Such expedients, however, have generally been inadequate.

In an industrial production process of dry cereal products, such as crispbread and biscuits, the ingredients (flour, liquid, requisite additives, such as salt, sugar, dough raising agents and possible spices) are mixed into a dough. A thin dough cake is baked rapidly at a high, accurately programmed temperature, and dried. The moisture content of the final product is extremely important and will vary depending on the product involved. In many instances, the crispness and preservation properties are maximized at a moisture content of between about 7% and about 9% by weight. On an average, the crispness of biscuits is at best at a moisture content of less than 4% by weight. In addition to water content, the crispness and preservation properties of biscuits and other products are affected by other factors, such as fat content. For example, the protein content of flour used in baking semi-sweet biscuits is of great importance for the crispness of the final product.

The quality of flour to be used in a dry bread product depends on the product to be prepared. In crispbread production, whole rye flour is used in most cases; however, the popularity of wheat crispbread is on the increase. Most biscuits are made of wheat, while the demand and consumption of oatmeal biscuits and especially of rye biscuits are insignificant.

The most important flour properties are those affecting the crumb structure, crispness and volume. With doughs raised with yeast, the "falling" number required for rye flour ranges from 120 to 200. (The "falling" number is measured by procedures well known and defined in the prior art.) The falling number of rye flour to be used in a dough raised by whipping gas into the dough (so called "ice bread") should also be relatively high. Sour, thick crispbread can be made from rye flour having a lower falling number, because the acidity prevents the inherent enzymes of flour from decomposing starch too far. The falling number of flour used in the production of biscuits should be high (more than 300) due to, e.g., their long production process and the rather high temperature of dough water in the production of semi-sweet biscuits, for instance.

Flour used in the production of crispbread usually has a relatively low protein content, generally varying between 8 and 12% by weight. The water-binding capacity of such flour is not as high as that of flour rich in protein, so less energy is required for drying during baking. In biscuit baking, protein content is of vital importance to the quality of flour and that of the product. The protein content of the flour should range from 7.5% to 10.5% by weight on dry substance. Flour having a protein content less than 10% by weight is best suited for baking semi-sweet biscuits.

Yeast or a chemical raising agent can be used for proofing. Proofing can also be effected by mixing gaseous substances into the dough.

In the production of both crispbread and biscuits, water or milk is used as dough liquid. In the production of crispbread, the amount of liquid needed is nearly equal to that of flour, that is, the dough is considerably softer than in the production of normal soft bread. In biscuit production, less liquid is usually needed than in the production of crispbread. The use of large amounts of liquid requires long baking times and large amounts of energy at the baking stage to reduce the water concentration of the final product to an acceptable level.

In a dry cereal product production process, the amount of dough liquid is in most cases determined by the technical qualities of the process and the apparatus. For example, the softness of a dough suitable for use in a crispbread production process and, as a consequence, the amount of liquid needed is determined on one hand by the mechanical strength of the blades of the dough mixer and on the other hand the operation of the pricking device. In addition, the webforming ability sets certain requirements on the softness of dough. Dough softness is described by a consistency value. (Consistency is measured by a penetrometer by allowing the measuring cone of the penetrometer to fall into the dough for 10 seconds, whereby the penetration of the cone in millimeters gives the consistency of the dough; the greater the value, the softer the dough. A penetrometer is a standard piece of equipment well known in the baking art.)

The crispness, taste, and machinability of crispbreads and biscuits can be increased by the use of fat and sugar.

In crispbread production, the dough is formed into a weblike mat after suitable proofing. The mat can be baked as such, or it can be cut or chopped into separate cakes, or the mat is formed into separate cakes by means of moulds, rolls, and the like. The cakes can be patterned before baking, e.g., by pricking. Pricking provides the product with a pattern typical of it, and binds the surface layers of the cake together. If necessary, the final proofing of the products is carried out after the patterning, whereafter the products are baked. So called "ice bread" is not proofed at this stage; it is baked immediately after the pricking.

Biscuits, such as semi-sweet biscuits, are often made by so-called "all-in" (or "straight") dough making process, in which the dough is prepared by mixing all the dry ingredients simultaneously with the dough liquid and other liquid ingredients. The way in which the dough is prepared is of great importance in the production of semi-sweet biscuits. As semi-sweet biscuits should possess an extensible gluten network, relatively high dough temperatures, about +40° C., are desirable in the dough preparation phase. An example of a mixer suitable for the production of biscuits is a horizontal two-blade mixer standard in the baking industry. After preparation, the dough should be allowed to stand so that the dough liquid is absorbed in the dry ingredients (floor time). After the floor time the dough is moulded, e.g., by means of a four-roll feeder and then folded by passing it through a pair of rolls. After folding the dough is passed through sheeting rolls. Sheeted dough is pricked and cut with a roll cutter (drum cutter).

The products lose moisture concentration during baking. The moisture content of a conventional finished crispbread product is about 7% to about 12% by weight. The moisture content of product raised with gas may be as low as about 2% by weight. On an average, the moisture content of biscuits does not exceed about 4% by weight.

To achieve the desired final moisture consent, the baked product usually has to be dried further. The drying can be effected by using a convection oven, basket conveyors transported above the oven in the waste heat, "after-baking", that is, drying in a tunnel oven, or dielectric drying. If necessary, the baked product can be chopped, e.g., by sawing.

It is known that cellulolytic/hemicellulolytic enzymes cleave non-starch polysaccharides present in flour. Addition of cellulolytic and/or hemicellulolytic enzymes has been used to improve the properties of the baking process and the finished baking product.

Japanese Patent Application No. 5701/1968 describes a method of improving the quality of white sour bread by adding to the dough an enzyme composition having cellulolytic and/or hemicellulolytic activity. It is emphasized in the patent application that the addition of the enzyme composition causes decomposition of fibrous components present in flour, such as cellulose and pentosans, the presence of which as such would considerably deteriorate the quality of bread by rendering the dough inhomogeneous and by preventing the formation of gluten. It is recited that the addition of cellulolytic/hemicellulolytic enzymes provides soft bread with increased volume, more uniform grain structure and slower ageing than bread prepared with prior art methods.

Finnish Patent Application No. 881905 (U.S. application Ser. No. 341,389 filed Apr. 21, 1989, now U.S. Pat. No. 4,990,343 describes the use of cellulolytic/hemicellulolytic enzymes in combination with glucose oxidase or glucose oxidase and sulphydryl oxidase in baking soft bread from wheat and rye flour. These enzymes are used for optimizing the baking process. Moreover, it has been found that the enzyme combinations improve the rheological properties, gluten, processability, and tolerance of a flour dough. It has also been found to improve the volume, grain structure and anti-staling properties of a bakery product.

However, because of the significant differences in the process for baking dry cereal products (such as crispbread, etc.) and the increased moisture content of dough used to bake these products, enzyme treatment of dough for dry cereal products has heretofore not been utilized. It has now been found according to the present invention that an addition of cellulolytic and/or hemicellulolytic enzymes increases the process capacity in the production of dry cereal products. Unexpectedly and surprisingly, the enzyme addition of the invention makes the dough softer, so less dough liquid is required as compared with conventional techniques. The reduced concentration of water requires less energy than prior art methods for baking the product and the need for after-drying is decreased or eliminated. In large scale baking processes, this improved efficiency will result in substantial cost savings.

In addition, the final product obtained by the method of the invention has a lower shrinkage and increased crispness.

SUMMARY OF THE INVENTION

One of the objects of the invention is to improve the baking process of dry cereal products by decreasing the necessary moisture concentration. The present invention contemplates a method for improving the production process of dry cereal products and the quality of the baked product produced therefrom which comprises combining flour, yeast and water with an amount of an enzyme preparation comprising hemicellulose and/or cellulose degrading enzymes effective to reduce the amount of moisture necessary to form a suitable baking dough. The resulting dough requires shorter baking time and the need for post-baking drying in order to reduce the moisture content of the final product to an acceptable level is decreased or eliminated.

Preferably, the enzyme preparation contains between about 0 to about 50,000 Units of hemicellulose degrading enzymes and about 0 to about 20,000 Units of cellulose degrading enzymes per kilogram of flour. An enzyme preparation which contains about 10 to about 20,000 Units of hemicellulose degrading enzymes and about 10 to about 10,000 Units of cellulose degrading enzymes per kilogram of flour is particularly preferred.

The method of the present invention can be used to produce dry cereal products such as crispbread, made of rye or wheat flour, as well as other dry cereal products such as biscuits, pretzels, ice cream cones, dark bread and the like.

When the final product is a rye crispbread, the method of the present invention wherein the enzyme preparation comprises about 1,000 to about 3,000 Units of hemicellulose degrading enzymes and/or about 400 to about 1,200 Units of cellulose degrading enzymes per kilogram of flour is preferred. When the final baked product is a wheat crispbread, an enzyme preparation which contains about 500 Units to about 2,000 Units of hemicellulose degrading enzymes and/or about 200 Units to about 800 Units of cellulose degrading enzymes per kilogram of flour is preferred. When the final baked product is a semi-sweet biscuit, an enzyme preparation which contains about 2,500 Units to about 10,000 Units of a hemicellulose degrading enzyme per kilogram of flour is preferred.

The instant invention contemplates a method which reduces the necessary moisture concentration of the baking dough up to approximately 15% by weight.

DETAILED DESCRIPTION OF THE PREFERRED EMBODIMENT

A. General

The method of the invention is characterized by adding an enzyme preparation containing hemicellulose and/or cellulose degrading enzymes to the dough.

The method of the invention provides a baking process with a greater capacity than prior art methods. The baking process of the invention has a lower energy consumption than prior art methods. The proof time is shorter and the baking shrinkage is lesser when the method of the invention is applied. The choice of flour is easier. The obtained product has advantageous properties over products prepared with prior art methods, such as increased crispness.

The enzyme preparation of the invention contains enzymes degrading hemicellulose (xylan, mannan, galactomannan, araban) and its cleavage products or esther-bonds contained therein and/or enzymes degrading cellulose.

For example, an enzyme preparation (BAKEZYME 1201, manufacturer Finnsugar Ltd.) having the following hemicellulolytic and cellulolytic activity is suitable for use in the present invention:

| Xylanase | 25,000 Units/g |
| Carboxymethyl cellulase (CMC) | 9,300 Units/g |
| Filter paper activity (FP) | 380 Units/g |

Xylanase activity represents hemicellulolytic activity while carboxymethyl cellulase activity and filter paper activity represent cellulolytic activity.

A suitable enzyme dosage level is, e.g., about 0 to about 50,000 Units, preferably about 10 to about 20,000 Units of hemicellulase (xylanase) and about 0 to about 20,000 Units, preferably about 10 to about 10,000 Units of cellulase (calculated as carboxymethyl cellulase activity), or correspondingly about 0 to about 1,000 Units, preferably about 0.5 to about 500 Units of cellulase (calculated as filter paper activity) per kg flour.

The definitions of the different enzyme activities and the methods of determining the enzyme activities are set forth below:

Xylanase activity (Khan A. W. et al, Enzyme Microb. Technol. 8 (1986) 373–377):

1 ml of a suitably diluted enzyme solution in acetate buffer (0.05M NaAc, pH 5.3) is tempered at 50° C. 1 ml of xylan substrate (1% xylan, 0.05M NaAc, pH 5.3) is added. The sample is incubated for 30 min at 50° C. The reaction is stopped by adding 3 ml of DNS reagent (3,5-dinitrosalicylate), and the color is developed by boiling the same mixture for 5 min. The absorbance is measured at 540 nm. One enzyme Unit liberates 1 micromole of reducing sugars per one minute calculated as glucose.

Carboxymethyl cellulase activity (Mandels M., Weber J., Adv. Chem. Ser. 95 (1969) 391–413):

1 ml of suitably diluted enzyme solution in acetate buffer (0.05M NaAc, pH 4.8) and 1 ml of CMC substrate (1% CMC, 0.05M NaAc, pH 4.8) are mixed together. The solution is incubated for 10 min. at 50° C. The reaction is stopped by adding 3 ml of DNS reagent. One enzyme Unit liberates 1 micromole of reducing sugars per one minute.

Filter paper activity (Ghose, T. K. et al., Symposium of Enzymatic Hydrolysis of Cellulose, Bailey M., Enari T. M., Linko M., Eds. (SITRA, Aulanko, Finland, 1975), p. 111–136:

A piece of filter paper (Whatman 1, 50 mg) is added to 1 ml of acetate buffer (0.05M NaAc, pH 4.8). 1 ml of suitably diluted enzyme solution is added. The solution is incubated for 1 h at 50° C. The reaction is stopped by adding 3 ml of DNS reagent, and the color is developed and measured similarly as in the xylanase determination. One activity Unit liberates 1 micromole of reducing sugars per one minute calculated as glucose.

B. Experimental

EXAMPLE 1

Crispbread Baking Trials

The use of the enzyme preparation disclosed herein results in the decrease of the moisture content for suitable baking doughs for dry cereal products. To establish the unexpected decrease in the amount of water using the present invention, the following test was carried out, in which BAKEZYME 1201 was added to the dough in the amount of 50 mg/kg flour.

Rye meal with a relatively high falling number was used in this crispbread baking test. The flour was measured for the following properties:

| Moisture content (% by weight) | 13.3 |
| Enzyme activity (U/kg flour d.s.) | |
| alpha-amylase | 675 Units |
| protease | 4,700 Units |
| xylanase | 2,100 Units |
| Protein (Kjeldahl) (% d.s.) | 10.0 |
| Starch (Boehringer-Mannheim kit) | 64.1 |
| Pentosan content (% by weight) | 8.2 |
| Falling number (7 g) | 208 |

The composition of the dough was as follows (amounts given as percentages on the amount of flour; the amount of flour used was 4 kg):

| Flour | 100 |
| Yeast | 5.5 |
| Salt | 1.9 |
| Water (control) | 90 |

In the trials set forth in Table 1, the enzyme dosage level was kept constant (50 mg/kg flour) with the exception of the control, and the amount of water was decreased (90%, 87.5% and 85% of the original amount).

The baking was carried out using the following method. First, room temperature flour, to which enzyme weighed with an analytical balance had been added, was introduced into the mixing bowl. Salt and yeast suspended in water were then added in solution form. Dough temperature was adjusted to 28° C. by means of the water temperature. The ingredients were mixed using a Hobart A 200 mixer for 12 minutes at speed 1. Mixing was followed by first proofing of 240 minutes, whereafter the dough was braked (homogenized) in the Hobart bowl. Sugar solution was also added for yeast food.

The dough was then rolled into a mat, pricked (embossed), proofed for 28 minutes (37° C., 90% relative humidity), and baked at a high temperature for 9 minutes. Changes in the consistency of the different doughs are shown in Table 1.

TABLE 1

Consistency of Doughs (as measured by penetrometer)

| Measurement Time | control | control | Addition of enzyme preparation: Hemicellulase (xyl. 1,250 U/kg flour Cellulase (CMC) 470 U/kg flour | | |
|---|---|---|---|---|---|
| | | | −9.5% H₂O | −12.5% H₂O | −15% H₂O |
| After mixing of dough | 16.0 | 16.0 | 15.5 | 15.5 | 13.5 |
| 1 h | 16.5 | 17.2 | 18.0 | 18.0 | 16.0 |
| 2 h | 19.0 | 18.0 | 21.0 | 21.0 | 18.5 |
| 3 h | 21.0 | 20.0 | 24.0 | 23.0 | 21.0 |
| After first proofing | 24.0 | 22.0 | 24.0 | 25.5 | 24.0 |
| After braking | 29.0 | 30.5 | 33.0 | 34.0 | 30.5 |

The results establish that even though the amount of water was decreased up to 15% from the control, the dough was still processable. The same final dough consistency of the control was achieved with a 15% decrease in the amount of water.

The finished, cooled product was further measured for its height, crispness, humidity and volume weight. There were no differences in these properties between the control product and products baked with dough treated with the enzyme preparation of the instant invention with up to a 15% reduction in water concentration.

EXAMPLE 2

Baking Trials With Varying Enzyme Dosages

Baking trials with various enzyme dosages and water concentrations were utilized. Flour with a lower falling number (165) than in the tests of Example 1 was used for these trials. Otherwise the baking was carried out as described in Example 1, adding BAKEZYME 1201 preparation in the amount of 90-150 mg/kg flour. In terms of enzyme activities, this enzyme dosage level is equivalent to about 2,250 to about 3,750 Units of hemicellulase (xylanase) and about 840 to about 1,400 Units of cellulase (calculated as carboxymethyl cellulose activity) or correspondingly about 35 to about 60 Units of cellulase (calculated as filter paper activity). The flour exhibited the following properties:

| Moisture content (% by weight) | 11.5 |
|---|---|
| Enzyme activity (U/kg flour d.s.) | |
| alpha-amylase | 506 Units |
| protease | 7,200 Units |
| xylanase | 2,400 Units |
| Protein (Kjeldahl) (% d.s.) | 11.1 |
| Starch (Boehringer-Mannheim kit) | 63.1 |
| Pentosan content (% by weight) | 16.4 |
| Falling number (7 g) | 165 |

The composition of the dough was as follows (amounts given as percentages on the amount of flour; the amount of flour used was 4 kg):

| Flour | 100 |
|---|---|
| Yeast | 3.8 |
| Salt | 2.1 |
| Water (control) | 90 |

Water amounts in this series of baking trials with respect to the control (in which the amount of water was 90% on the weight of flour=100%) were 112%, 107%, 100% and 85%. BAKEZYME 1201 dosage levels were 90, 100, 105, 120, 150 mg/kg flour.

The dough was mixed similarly as in Example 1 except that the first proof time was only 120 minutes. At the braking stage, a glucose solution was added for yeast food. The dough moulding steps were the same as in Example 1 except that the proof time was only 21 minutes (at 35° C., 85% relative humidity). The products were baked at a high temperature for 8 minutes and allowed to cool before measurement of properties. Dough consistencies as a function of time are shown in Table 2.

TABLE 2

Consistency of Dough (as measured by penetrometer)

| Trial | 1 | 2 | 3 cont. | 4 cont. | 5 | 6 | 7 | 8 | 9 | 10 | 11 |
|---|---|---|---|---|---|---|---|---|---|---|---|
| Hemicellulase (xyl.) U/kg | — | — | — | — | — | 2250 | 2500 | 2500 | 2630 | 3000 | 3750 |
| Cellulase (CMC) U/kg | — | — | — | — | — | 840 | 930 | 930 | 980 | 1120 | 1400 |
| Water (ml) | 4030 | 3850 | 3600 | 3060 | 3060 | 3060 | 3060 | 3060 | 3060 | 3060 | 3060 |
| Water amount % (on zero level) | 112 | 107 | 100 | 100 | 85 | 85 | 85 | 85 | 85 | 85 | 85 |
| After mixing of dough | 19.0 | 17.8 | 16.0 | 16.0 | 12.5 | 14.5 | 17.5 | 17.5 | 17.0 | 17.0 | 18.5 |
| 40' | 22.0 | 20.5 | 18.8 | 18.0 | 14.0 | 17.5 | 18.0 | 18.5 | 18.0 | 20.0 | 21.0 |
| 80' | 24.5 | 24.0 | 20.5 | 21.5 | 17.0 | 19.0 | 21.5 | 21.5 | 19.5 | 21.0 | 22.0 |
| After first proofing | 26.5 | 25.0 | 21.0 | 23.0 | 17.5 | 20.0 | 22.0 | 22.0 | 22.5 | 22.5 | 23.0 |
| After braking | 28.5 | 27.5 | 24.5 | 26.5 | 19.0 | 24.0 | 26.5 | 25.0 | 25.0 | 25.5 | 28.0 |

Doughs having a "normal" consistency after braking (that is, the two controls (trials 3 and 4) and doughs prepared with a water amount of 85% and enzyme dosage level 100-120 mg/kg (2,500-3,000 U/kg)) (trials 7-10) gave similar final products. Samples baked from a softer dough (enzyme dosage level 150 mg/kg (3,750 U/kg) (trial 11) or water amounts of 112% and 107%, respectively) (trials 1 and 2) yielded non-homogeneous texture. Product prepared from too hard a dough (enzyme dosage level 90 mg/kg (2,250 U/kg) +85% water without enzyme) (trial 5) gave bread with reduced height.

EXAMPLE 3

Crispbread Baking Trials

A baking test was carried out on a continuously operated bakery-scale crispbread baking line. The ratios and quality of the dough ingredients were the same as those used in Example 2. Enzyme preparation (BAKEZYME 1210) in the amount of 90 mg/kg flour was added: (enzyme activity: 2,250 Units of hemicellulase (xylanase) and 840 Units of cellulase (CMC) per kg flour); the amounts of dough water were reduced to about 85% of the "normal" percentage, as in Example 2. Since the mass flow contained more dry substance than usual, the weight of an unbaked cake was dropped 6.25% from the normal value.

The width of the unbaked cake could also be reduced by about 1.0% since the dough prepared with the enzyme addition had a better rise than a product prepared without enzyme addition.

The oven time utilized was conventional, whereby a 7.7% increase in capacity was obtained with the enzyme addition (decrease in energy demand).

With the addition of the enzyme preparation, the dough rose more rapidly than normal and the properties of the finished product were good. The crispness of the product was observed to be slightly greater than that of a control product prepared without enzyme addition.

A similar test was carried out by keeping the amount of energy at a conventional value and shortening the oven time by 7.7%, corresponding to the decrease in energy demand. The properties of this product were good and similar to the properties noted above, suggesting that less energy is required (when the present invention is utilized) to bake the final product than normally required.

EXAMPLE 4

Wheat Crispbread Baking Trials

Wheat crispbread was baked using the invention on a pilotscale test basis.

Flour with the following properties was used in the wheat crispbread baking tests:

| Moisture content (%) | 13.4 |
| --- | --- |
| Ash content (% d.s.) | 0.6 |
| Amount of moist gluten (%) | 26.0 |
| Water binding ability (farinograph method)[1] | 58.1% |
| Maximum temperature (amylograph method)[1] | 74° C. |
| Maximum height of amylogram | 330 AU |
| Enzyme activities (U/kg flour d.s.) | |
| amylase | 430 |
| protease | 3030 |
| xylanase | 1980 |

[1]The farinograph and amylograph methods - used by bakers worldwide - to evaluate the rheological and technical properties of dough. The farinograph method is described by American Association of Cereal Chemists method AACC 54-51, the amylograph by International Association of Cereal Chemists, Method FC 126.

Flour and the other dry ingredients were first mixed into a powdery mixture. Yeast and water were subsequently added to the mixture.

Composition of the powder mixture was as follows:

| Flour | 87.2% |
| --- | --- |
| Sugar | 5.0% |
| Fat | 5.0% |
| Salt | 1.8% |
| Yeast | 5% on weight of powder mixture |
| Water | 57.5% on weight of powder mixture |

In the test series, the enzyme dosage level and the water decrease were determined in such a manner that the dough consistency remained constant.

The baking (2 kg of dough) was carried out similarly as in Example 1 except that the first proof time was 1 hour and the final proof time 45 min. Enzyme dosage levels used (BAKEZYME 1201) and water amounts are shown in Table 3 as set forth below.

TABLE 3

Consistency of Crispbread Dough (measured by penetrometer) Over Time

| Trial* | 1 | 2 | 3 | 4 |
| --- | --- | --- | --- | --- |
| Hemicellulase (xyl.) (U/kg) | — | 625 | 1250 | 1880 |
| Cellulase (CMC) (U/kg) | — | 230 | 470 | 700 |
| Amount of water (ml) | 1160 | 1070 | 960 | 850 |
| Amount of water, % on powder mixture | 57.5 | 53.5 | 48.0 | 42.5 |
| Consistency after mixing the dough | 20.0 | 20.5 | 20.5 | 20.0 |
| Consistency after first proof | 21.0 | 21.5 | 21.0 | 21.5 |
| Consistency after braking | 30.0 | 31.0 | 31.0 | 31.5 |

*Trial 1 functioned as the control

There were no differences in the measured properties of products prepared from the dough with constant consistency. The measured properties of the final product were the same as in Example 1.

EXAMPLE 5

Semi-Sweet Biscuit Trials

Semi-sweet biscuits were baked with wheat flour having the following properties.

| Moisture content (%) | 12.7 |
| --- | --- |
| Enzyme activity (U/kg flour d.s.) | |
| alpha-amaylase | 223 Units |
| protease | 1,450 Units |
| xylanase | 1,809 Units |
| Protein (% d.s.) (Kjeldahl × 5.7) | 10.8 |
| Falling number | 365 |
| Ash (% d.s.) | 0.66 |
| Swelling number | 5 |
| Water binding (ml/300 g flour) | 172 |

Composition of the basic dough:

| Ingredient | (g) | (% on flour) |
| --- | --- | --- |
| Wheat flour | 492 | 100 |
| Vegetable fat | 82 | 16.6 |
| Icing sugar | 90 | 18.2 |
| Glucose | 17 | 3.4 |
| Fructose | 17 | 3.4 |
| Starch syrup TS 40 | 21 | 4.3 |
| Cornstarch | 70 | 14.3 |
| Dry skim milk | 21 | 4.2 |
| Table salt | 5 | 1 |

-continued

| Ingredient | (g) | (% on flour) |
|---|---|---|
| Volatile salt | 6.9 | 1.4 |
| Tartaric acid | 0.8 | 0.2 |
| Baking soda | 1.9 | 0.4 |
| Sodium disulfite, 10% aqueous solution | 3.8 | 0.8 |
| Water | 160 | 32.5 |
| Total | 988.2 | |

The enzyme preparation used was BAKEZYUME 1201 having a xylanase activity of 25,000 U/g. (manufacturer Finnsugar Ltd.) was added to the dough as follows:

| Sample | Xylanase U/g flour |
|---|---|
| A (control) | 0 |
| B | 500 |
| C | 1,000 |
| D | 1,500 |
| E | 2,500 |
| F | 5,000 |
| G | 10,000 |

Baking was carried out under pilot kitchen conditions by the so-called "all-in" baking process as follows:

Water (+42° C.) was introduced into the bowl of a Kenwood Chef mixer. Sodium disulfite solution and starch syrup were added to the water as well as the mixed dry ingredients of the formula. Fat was added on the dry ingredients.

The dough was kneaded (kneading hook) for one minute at the lowest speed of the mixer and for four minutes at speed IV. After kneading the temperature of the doughs varied between about +29° C. and +31° C. and pH between about 8.0 and about 8.3.

The softness of the doughs was measured immediately after kneading with a penetrometer (SUR, PNR 6, cone probe, penetration time 10 s). The softness and stickiness of corresponding doughs containing more water, for the reasons of the measuring technique used, were also measured with a farinograph (Brabender) by introducing 300 g of dough into the trough of the farinograph and by kneading it at constant temperature +30° C. at farinograph speed 2 for 10 minutes. The softness value was obtained after 5 minute kneading as farinogram height (Brabender unit, BU), stickiness was measured from the corresponding graph point as farinogram width (BU).

After 10 minutes of floor time the doughs were first rolled manually into 3×3 mm thick sheets and then on a grease-proof paper into a 1 mm thick sheet which was cut manually with a round mould (diameter 61 mm). The whole cut dough sheet was transferred to a baking sheet covered with a 1 mm hole network. On the baking sheet the dough sheet was pricked manually by means of a pricking wheel and the dough remaining outside the cut portions was removed.

The biscuits were baked in a convection oven for 7 minutes at 180°-200° C., whereafter they were transferred onto a tray and allowed to cool at room temperature.

After having cooled for half an hour, the finished biscuits were measured for their moisture content (at 130° C., 1 h). The moisture content varied from about 3.0% to about 6.5% by weight. The pH of the biscuits varied from about 7.0 to about 7.7.

The effect of the enzyme treatment on the softness and stickiness of the biscuit dough is set forth in Tables 4 and 5 below.

TABLE 4

Effect of Enzyme Treatment on the Softness of Biscuit Dough as Measured with a Penetrometer

| Sample | Xylanase (U/kg flour) | Penetration (1/10 mm) (%) | Penetration delta A |
|---|---|---|---|
| A | 0 | 252 | 0 |
| B | 500 | 256 | +2 |
| C | 1,000 | 247 | −2 |
| D | 1,500 | 255 | +1 |
| E | 2,500 | 256 | +2 |
| F | 5,000 | 263 | +4 |
| G | 10,000 | 269 | +6 |

TABLE 5

Effect of Enzyme Treatment on the Softness and Stickiness of a Biscuit Dough as Measured with a Farinograph

| Sample | Xylanase (U/kg flour) | Softness (BU) | Softness delta A (%) | Stickiness (BU) | Stickiness delta A (%) |
|---|---|---|---|---|---|
| A | 0 | 675 | 0 | 160 | 0 |
| B | 500 | 735 | +3 | 170 | +10 |
| C | 1,000 | 690 | +2 | 160 | 0 |
| D | 1,500 | 770 | +12 | 220 | +27 |
| E | 2,500 | 750 | +10 | 170 | +6 |
| F | 5,000 | 670 | −0.7 | 130 | −19 |
| G | 10,000 | 160 | +76 | 80 | −50 |

The enzyme treatment improved the processability and rollability of the biscuit dough. This effect was most marked with the xylanase activity of 2,500–10,000 U/kg flour.

The enzyme treatment increased the softness of the dough, especially with the xylanase activity of 2,500–10,000 U/kg flour, with the best results from the xylanase activity of 5,000–10,000 U/kg flour.

The use of an enzyme preparation also decreased the stickiness of the biscuit dough, particularly with the samples with xylanase activity of 5,000–10,000 U/kg flour.

By means of the enzyme treatment, the amount of dough water could be decreased about 9% on the total amount of water without affecting adversely the processability and the quality of the final product, when the enzyme preparation was added in the dough so that the xylanase activity was about 2,500 to about 10,000 U/kg flour; preferably about 10,000 U/kg flour.

The enzyme treatment described herein is likewise applicable to the production of other dry cereal products, such as rusk, breadcrumbs, sour crispbread, crackers, baked snacks, waffles, pretzels, ice cream cones and dark bread.

The foregoing general discussion and experimental examples are intended to be illustrative of the present invention, and are not to be considered limiting. Other variations within the spirit and scope of this invention are possible and will present themselves to those skilled in the art.

We claim:

1. A method for the production of dry cereal products having a final moisture content of less than about 12% by weight, which provides for a reduction in the amount of initial water added to create processible dough, which comprises:
  combining flour, water, yeast and at least 10 units of an enzyme preparation per kilogram of flour, said enzyme preparation comprising cellulose and hemicellulose degrading enzymes in an amount effective to form a mass with suitable consistency for processing and baking;
processing said dough;
baking said processed dough at a suitable temperature;
drying said dry cereal product, if necessary, to reduce the final moisture content of said product to less than about 12% by weight.

2. The method of claim 1 wherein the amount of water added is up to about 15% less than the amount of water necessary to form a mass of suitable consistency in the absence of the enzyme addition.

3. The method of claim 2 wherein the baking time of said processed dough is about 15% less than the baking time required in the absence of the enzyme addition.

4. The method of claim 1 wherein said dry cereal product is crispbread.

5. The method of claim 4 wherein said crispbread is rye crispbread.

6. The method of claim 4 wherein said crispbread is wheat crispbread.

7. The method of claim 1 wherein said dry cereal product is a semi-sweet biscuit.

8. The method of claim 6 wherein said enzyme preparation is added in an amount of about 500 to about 2,000 Units of hemicellulose degrading enzymes and about 200 to about 800 Units of cellulose degrading enzymes per kilogram of flour.

9. The method of claim 7 wherein said enzyme preparation is added in an amount of about 2,500 to about 10,000 Units of hemicellulose degrading enzymes per kilogram of flour.

10. The method of claim 1 wherein said dry cereal product has a final moisture content of between about 7% to about 9% by weight.

11. The method of claim 2 wherein said dry cereal product has a final moisture content of less than about 4% by weight.

12. The method of claim 1 wherein said hemicellulose degrading enzyme is xylanase.

13. The method of claim 1, wherein said enzyme preparation is added in the amount of about 10 to about 50,000 Units of hemicellulose degrading enzymes per kilogram of flour.

14. The method of claim 1, wherein said enzyme preparation is added in the amount of about 10 to about 20,000 units of cellulose degrading enzymes per kilogram of flour.

15. The method of claim 1, wherein said enzyme preparation is added in the amount of about 10 to about 50,000 of hemicellulose degrading enzymes and about 10 to about 20,000 units of cellulose degrading enzymes per kilogram of flour.

16. The method of claim 5, wherein said enzyme preparation is added in the amount of about 1,000 to about 3,000 Units of hemicellulose degrading enzymes per kilogram of flour.

17. The method of claim 5, wherein said enzyme preparation is added in the amount of about 400 to about 1,200 Units of cellulose degrading enzymes per kilogram of flour.

18. The method of claim 5, wherein said enzyme preparation is added in the amount of about 1,000 to about 3,000 Units of hemicellulose degrading enzymes and about 400 to about 1,200 Units of cellulose degrading enzymes per kilogram of flour.

19. The method of claim 6, wherein said enzyme preparation is added in the amount of about 500 to about 2,000 Units of hemicellulose degrading enzymes per kilogram of flour.

20. The method of claim 6, wherein said enzyme preparation is added in the amount of about 200 to about 800 Units of cellulose degrading enzymes per kilogram of flour.

21. The method of claim 6, wherein said enzyme preparation is added in the amount of about 500 to about 2,000 Units of hemicellulose degrading enzymes and about 200 to about 800 Units of cellulose degrading enzymes per kilogram of flour.

22. The method of claim 15 wherein said enzyme preparation is added in an amount of about 10 to about 20,000 Units of hemicellulose degrading enzymes and about 10 to about 10,000 Units of cellulose degrading enzymes per kilogram of flour.

* * * * *